Sept. 28, 1965   J. I. ANDERSEN   3,208,320
PIPE APPARATUS
Filed Dec. 2, 1963   3 Sheets-Sheet 2

INVENTOR:
JOHN I. ANDERSEN
BY: Lawrence J Winter
ATTORNEY

INVENTOR:
JOHN I. ANDERSEN
BY: Lawrence J. Winter
ATTORNEY

United States Patent Office 3,208,320
Patented Sept. 28, 1965

3,208,320
PIPE APPARATUS
John I. Andersen, Box 151, 206 Alpine Drive,
Idaho Falls, Idaho
Filed Dec. 2, 1963, Ser. No. 327,470
12 Claims. (Cl. 82—71)

The present invention relates to an apparatus for use with tubular members or conduits such as large diameter metal or concrete pipes.

In accordance with the present invention, a structure is provided for mounting or carrying a tool or implement for working on a large diameter tubular member. Different types of tools can be interchangeably carried by the structure for different types of operations on large diameter pipes or conduits. For example, the structure can carry a saw blade for sawing large diameter metal or concrete pipes, for marking the pipe, for welding it, fusing, stitching, vulcanizing, threading, grooving, painting, coating, wrapping, and the like.

It is an object of the present invention to provide a structure for carrying a cutting implement, which implement can move around the complete circumference of a tubular member which is to be cut.

It is another object of the present invention to provide a positioning device carrying an implement thereon for working on a large diameter tubular member, which implement can be completely rotated around the circumference of the tubular member.

It is another object of the present invention to provide a ring structure carried by a frame with cutting means carried on the ring structure and drive means for rotating or walking the cutting means around the periphery of a tubular member concentrically disposed within the ring structure for sawing or cutting the tubular member.

It is another object of the present invention to provide a tool-positioning device for use with large diameter pipes having a ring member which is substantially vertical and is suspended or carried by a frame, which ring member can be pivoted or rotated about its vertical axis, with a moveable carriage carried by the ring member, which carriage can be completely rotated around the ring member to move a cutting implement around the pipe in order to cut the pipe at various angles including a straight cut and a 45 degree cut.

It is another object of the present invention to provide a tool-positioning device consisting of a ring member upon which is mounted a carriage for rotation around the ring member and which carriage carries a cutting implement and is provided with hydraulic ram means for moving the cutting implement toward and away from a pipe concentrically disposed within the ring and extending therethrough.

Various other objects and advantages of the present invention will be readily apparent from the following detailed description when considered in connection with the accompanying drawings forming a part thereof, and in which FIGURE 1 is a front elevational view of the tool-positioning device of the present invention;

FIGURE 5 is a section taken along the line 5—5 of FIGURE 1;

FIGURE 6 is a fragmentary detailed view of the cutting implement embodied in the present invention along the line 6—6 of FIGURE 1;

Figure 1:
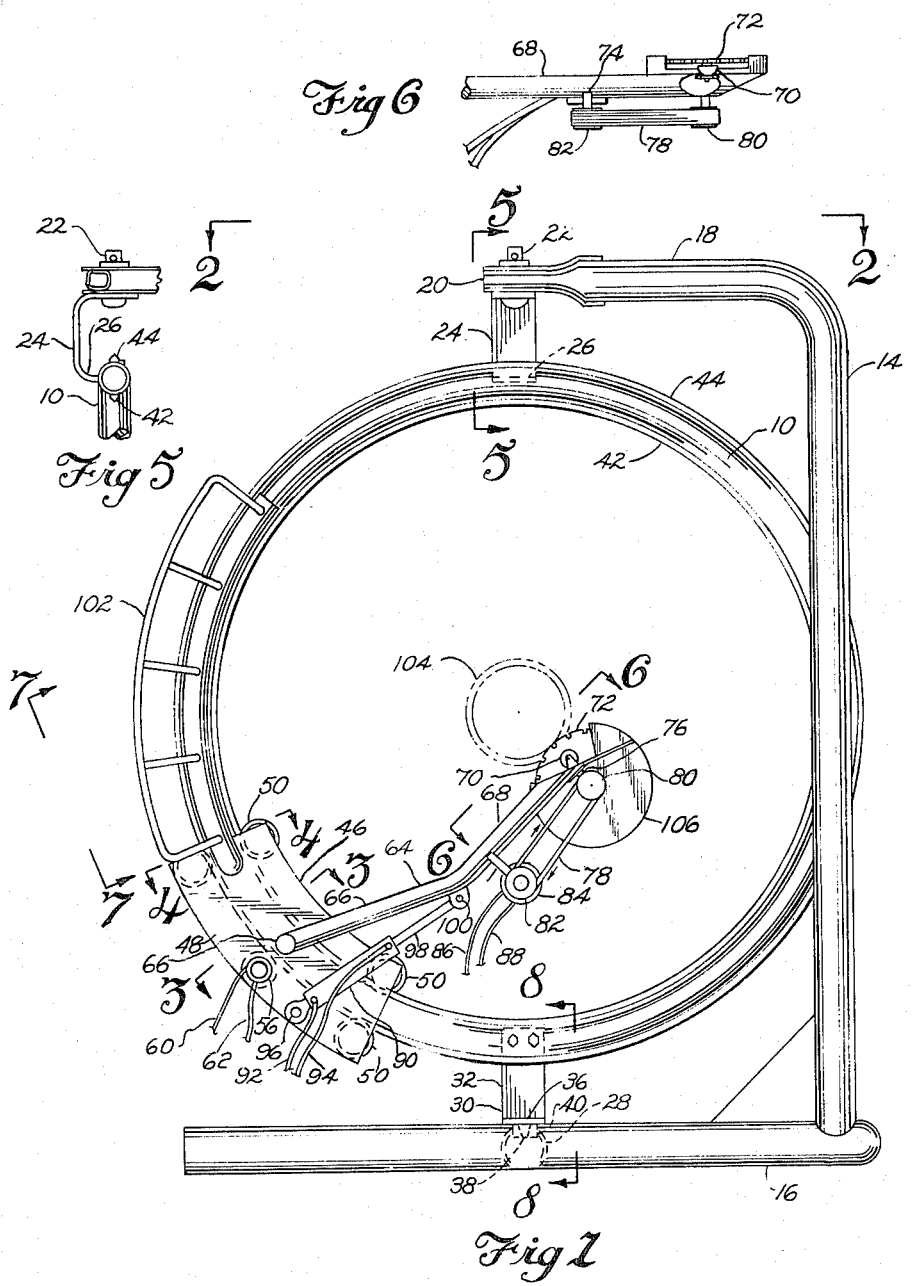

Referring to the drawings, the reference numeral 10 generally designates a large tubular ring member disposed in a substantially vertical direction. The ring member 10 is pivotally supported or carried about its vertical axis by a ring support arm 14 secured to a base frame 16. The support arm 14 consists of a vertical tubular post secured at its bottom to the tubular horizontal base frame 16 and has its upper end extending substantially horizontally toward the center of the base frame, as indicated at 18. The extreme inner end 20 of the portion 18 is provided with a vertical pivot pin 22 secured thereto, which pin 22 carries a U-shaped suspension bracket 24, as best seen in FIGURE 5. The bracket 24 has a short lower leg 26 welded to the rear side or face of the ring member 10. The ring member 10 is pivotally connected through the bracket 24 to the pivot pin 22 so that its vertical axis coincides with the vertical axis of the pin 22. It will also be noted that the bracket 24 is offset laterally to one side of the ring 10 so that the moveable carriage, as described hereinafter, can readily move through the space between the top of the ring and the bottom of the pin 22.

Figure 8:
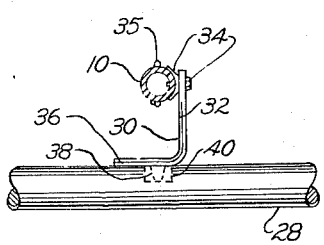
FIGURE 8 is a section taken along the line 8—8 of FIGURE 1.
Figure 3:
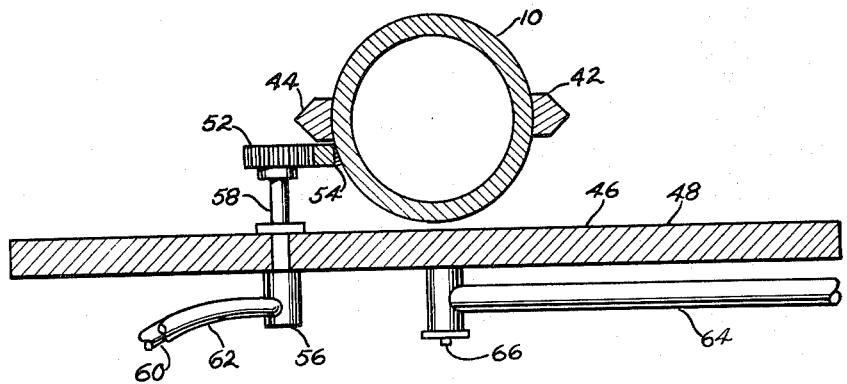
FIGURE 3 is an enlarged section taken along the line 3—3 of FIGURE 1.
Figure 4:
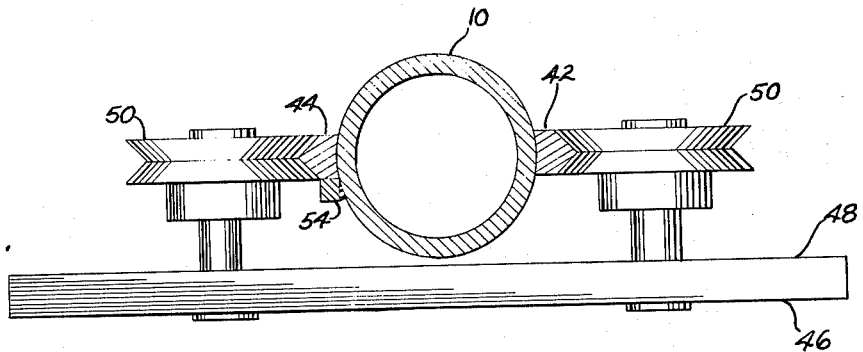
FIGURE 4 is an enlarged section taken along the line 4—4 of FIGURE 1.

Referring to FIGURE 8, the lower end of the ring 10 is pivotally connected to a cross-brace 28 of the base frame 16 by an L-shaped bracket 30. The vertical leg 32 of brace 30 is laterally offset from the rear side or face of ring 10 and has its upper end secured thereto by a plurality of stud members 34. The lower horizontal leg 36 of the bracket 30 has secured to its lower side a pin 38 disposed in a bearing 40 in the cross-brace 28. The bracket 30 is of sufficient size so that the carriage which moves around the ring as hereinafter described can readily pass between ring 10 and the horizontal leg 36 of the bracket. The axis of pin 38 coincides with the vertical axis of the ring member 10 and the pin member 22.

The top and bottom of the ring member 10 are provided with identical V-shaped track members 42 and 44, respectively. The track members extend continuously around the inner and outer sides of the ring and are secured thereto by welding, or other similar means.

A carriage member generally designated 46 is provided for rotational movement about the stationary ring member 10. The carriage member 46 is provided with an arcuate plate member 48 disposed in spaced relationship with the front side of the ring member 10, and has spaced pairs of rollers 50 adapted to roll along the track members 42 and 44. The rollers 50 are disposed adjacent opposite ends of the plate member 48, as best seen in FIGURE 1. The plate member 48 also carries a drive gear 52 adjacent the lower central portion thereof adapted to mesh with a ring sprocket 54 secured to one side of the track member 44. The carriage drive gear 52 is driven by a hydraulic motor 56 carried on the front side of plate member 48 and connected thereto by a drive shaft 58. Hydraulic fluid is supplied to the motor 56 through supply lines 60 and 62 in communication with a source fluid under pressure such as a pump or other well-known means.

A tool-positioning arm 64 is pivotally connected, as indicated at 65, to the central portion of plate 48 and adjacent its front face and above hydraulic motor 56. Positioning arm 64 has two diverging portions 66 and 68 which form a shallow V and face in a direction toward the center of the ring member 10. The inner end of portion 68 is provided with a roller stop device 70 thereon to stop the depth of cut that the cutting tool can make in a tubular member or concrete pipe which is being worked on.

A circular cutting blade or saw 72 is secured to portion 68 of the positioning arm by strut members 74 and 76. The blade 72 is driven through belt means generally designated 78 carried by a pulley or sheave 80 and 82. The sheave 82 is driven by a hydraulic motor 84 having fluid supply lines 86 and 88 connected to a pump or other well known means, not shown.

The plate member 48 is also provided with a hydraulic ram or jack 90 having fluid supply lines 92 and 94. The hydraulic ram 90 is fixed or secured to the plate member 48 as indicated at 96. The end of the plunger 98 of the ram 90 is pivotally connected at 100 to the positioning arm 64 adjacent the inner end of the portion 66, as shown in FIGURE 1.

Figure 7:
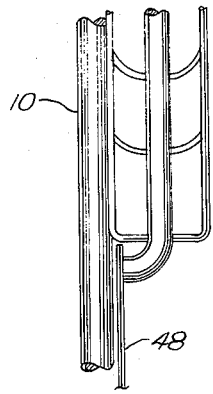
FIGURE 7 is an enlarged fragmentary detailed view looking in direction indicated by the lines 7—7 of FIGURE 1.

Referring to FIGURES 1 and 7, the plate member 48 carries adjacent its rear end a tubular open network rack member 102 of arcuate configuration for keeping the hydraulic fluid supply lines out of the way when work is being performed on a pipe 104 positioned concentrically within the ring member 10.

It will also be noted that the cutter blade 72 is completely enclosed within a shield member 106, except for the portion of the cutter blade 72 that is to make the cut into the pipe 104.

Figure 2:
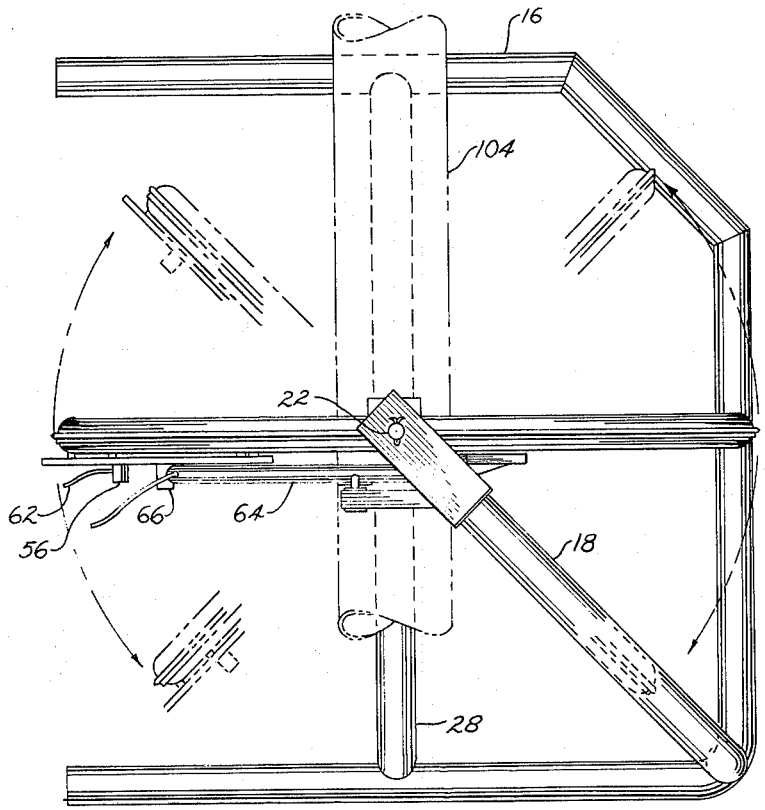
FIGURE 2 is a top plan view of the tool-positioning device of the present invention showing the ring member embodied therein positioned at various angles with respect to a pipe to be cut.

In operation, when it is desired to cut a tubular member or pipe, the pipe 104 is positioned concentrically within the ring member 10 by any well-known support means, not forming part of the invention. The pipe is lined up so that its vertical and horizontal axes coincide with the vertical and horizontal axes of the ring member. If it is desired to make a straight cut through the pipe, the ring member 10 is positioned so as to be perpendicular to the pipe 104. If it is desired to cut the pipe at an angle, the ring member 10 can be revolved or rotated about the pin 22 and the pin 38 at any desired angle, as best illustrated in FIGURE 2.

The revolving cutter blade 72 is then brought into a cutting position by operating the control ram 90 to pivot the positioning arm 64 inwardly until the blade 72 touches the outer surface of the pipe 104. Blade 72 will begin to saw and penetrate into the pipe. Thereafter, to continue sawing around the periphery of the pipe 104, power is applied to the carriage drive gear 52 which is enmeshed with the ring sprocket 54 so that the carriage plate member 48 rotatably moves around the ring member 10 with the rollers 50 riding on the track members 42 and 44. As the blade 72 walks or travels around the circumference of the pipe in a circular direction, the pipe is continuously cut until one portion is severed from the other portion.

If it is desired to only cut the pipe in certain portions of the circumference, the hydraulic ram is actuated so as to move or pull the blade 72 and the positioning arm 64 away from the surface or circumference of the pipe 104. If it is desired to cut the pipe at an angle, for example, of 45 degrees, or so that the blade has to travel in an elliptical path, the blade can be controlled very accurately by movement of the positioning arm 64 by the hydraulic ram 90.

From the foregoing description it will be apparent that the present invention provides an apparatus for positioning a cutting tool and the like around the circumferential periphery of a tubular member so that only the tool contacts the surface of the tubular member and no other part of the apparatus interferes with the work being done on the tubular member.

The present invention further provides an apparatus for pipe fabrication and the like with tool-positioning means that can be utilized with pipes of various sizes and which can be utilized further with various types of tools or implements that can be interchangeably connected thereto for cutting, welding, threading, grooving, and various other types of operations.

Inasmuch as changes may be made in the form, location, and relative arrangement of the several parts of this invention without departing from the essential characteristics of the invention, it will be understood that this invention is not to be limited except by the scope of the appended claims.

What is claimed is:

1. A tool positioning device comprising a frame, a vertical stationary ring member supported by said frame, track means extending around the circumference of said ring member, carriage means extending adjacent a short circular section of said ring member only and disposed on said track means for rotational movement around the circumference of said ring member, drive means for driving said carriage means around said ring member, said ring member being of a substantially larger diameter than the workpiece to be worked on, a tool positioning arm having its outer end pivotally connected to said carriage means and said arm extending inwardly toward the center of said ring member, a pipe tool working means connected to the inner end of said arm for working on a pipe member adapted to be positioned within said ring member, and feed means secured to said carriage means and said arm for moving said arm toward and away from the center of said ring member.

2. The device of claim 1 wherein said arm consists of a shallow V-shaped elongated member and said feed means is a hydraulic ram is pivotally connected to the outer leg of the V-shaped member.

3. The device of claim 1 wherein said carriage means comprises an arcuate plate member with rollers disposed on said track means.

4. The device of claim 1 wherein means are provided for pivoting said ring member about its vertical axis.

5. The device of claim 1 wherein said tool working means is a saw blade.

6. A tool-positioning device comprising a frame with a vertical suspension member, a vertical stationary ring member, means connecting the top and bottom of said ring member to said vertical member and frame for pivoting about its vertical axis, circular track members disposed on the inner and outer surfaces of said ring member, an arcuate vertical plate with rollers disposed to rotate around said track members, a sprocket member disposed around said ring member, a gear member on said plate adapted to engage said sprocket, drive means fixed to said plate and carried thereby for driving said gear member and plate around said ring member, an elongated tool-positioning arm having its outer end pivotally connected to said plate and its inner end extending toward the center of said ring member, a pipe tool carried adjacent the inner end of said arm, and a hydraulic ram fixed to said plate wtih a plunger pivotally connected to the central portion of said elongated arm for moving said tool toward and away from a pipe adapted to be positioned concentrically of said ring member.

7. The device of claim 6 wherein said ring pivoting means consist of a V-shaped lug and pin adjacent the ring top and an L-shaped lug and pin adjacent the bottom of the ring.

8. The device of claim 6 wherein said tool is a saw blade disposed in a shield member, and stop means are provided on the inner end of said arm to limit the cutting depth of said blade.

9. The device of claim 6 wherein said plunger is pivotted to the side of said arm facing away from the center of the ring member.

10. The device of claim 6 wherein said arm and ram are disposed on said vertical plate member on the side thereof facing away from said ring member.

11. The device of claim 6 wherein open net work rack means are carried on one end of said plate member.

12. A tool positioning device comprising a frame with a vertical suspension member, a vertical stationary closed ring, a V-shaped lug and pin adjacent the top of the ring and an L-shaped lug and pin adjacent the bottom of the ring, said ring being pivotally connected to said pins to pivot about its vertical axis, circular track members disposed on the inner and outer surfaces of said ring, an arcuate vertical plate with rollers disposed to rotate around said track members, a sprocket member fixed around said ring, a gear member secured to said plate adapted to engage said sprocket, drive means fixed to said plate for movement therewith for driving said gear member and plate around said ring, an elongated tool positioning arm having its outer end pivotally connected to said plate and its inner end extending toward the center of said ring, a saw blade carried adjacent said inner end disposed in a shield, stop means on the inner end of said arm to limit the cutting depth of said blade, and a hydraulic ram fixed to said plate with a plunger pivotally connected to the central portion of said arm for moving said tool toward and away from a pipe held concentrically in said ring, and open network rack means carried by said plate.

References Cited by the Examiner

UNITED STATES PATENTS

| | | | |
|---|---|---|---|
| 747,544 | 12/03 | Fromm | 82—101 |
| 1,256,556 | 2/18 | Hedges | 82—76 |
| 1,985,541 | 12/34 | Hoefer | 82—66 X |
| 2,011,623 | 8/35 | French | 83—581 X |
| 2,284,319 | 5/42 | Herrmann | 90—13.7 |
| 2,622,327 | 12/52 | Halonen | 82—14 X |
| 3,029,674 | 4/62 | Southwell et al. | 82—71 |

FOREIGN PATENTS

| | | |
|---|---|---|
| 829,359 | 3/60 | Great Britain. |

WILLIAM W. DYER, Jr., *Primary Examiner.*

LEON PEAR, *Examiner.*